United States Patent
Peng et al.

(10) Patent No.: US 12,487,149 B2
(45) Date of Patent: Dec. 2, 2025

(54) CONTROL METHOD FOR DRONE INSPECTION OF CHEMICAL PRODUCTION PLANT, ELECTRONIC DEVICE AND STORAGE MEDIUM

(71) Applicant: ZHEJIANG HENGYI PETROCHEMICAL CO., LTD., Zhejiang (CN)

(72) Inventors: Xiantao Peng, Zhejiang (CN); Peng Wang, Zhejiang (CN); Yibo Qiu, Zhejiang (CN); Dake Li, Zhejiang (CN); Feng Xu, Zhejiang (CN); Junliang Jin, Zhejiang (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 0 days.

(21) Appl. No.: 18/955,501

(22) Filed: Nov. 21, 2024

(65) Prior Publication Data
US 2025/0189409 A1    Jun. 12, 2025

(30) Foreign Application Priority Data
Dec. 7, 2023    (CN) .................. 202311677612.X

(51) Int. Cl.
*G06F 11/30* (2006.01)
*G01M 99/00* (2011.01)
(Continued)

(52) U.S. Cl.
CPC ........ *G01M 99/005* (2013.01); *G05D 1/2285* (2024.01); *G05D 1/686* (2024.01);
(Continued)

(58) Field of Classification Search
CPC .................................................. G01M 99/005
See application file for complete search history.

(56) References Cited

U.S. PATENT DOCUMENTS

2023/0120285 A1    4/2023 Zhang et al.

FOREIGN PATENT DOCUMENTS

| CN | 108632071 A | 10/2018 |
| CN | 109032187 A | 12/2018 |

(Continued)

OTHER PUBLICATIONS

First Office Action dated Jan. 15, 2024 in Chinese Patent Application No. 202311677612.X.
(Continued)

*Primary Examiner* — Phuong Huynh
(74) *Attorney, Agent, or Firm* — Perilla Knox & Hildebrandt LLP

(57) ABSTRACT

Provided is a control method, system and apparatus for drone inspection of a chemical production plant, relating to the field of chemical fiber intelligent technology. The control method includes: determining a first drone for performing a preset inspection task in a target scene, wherein the first drone is responsible for the preset inspection task of the chemical production plant; obtaining data of a target object collected by the first drone in the target scene; determining a state of the target object in the target scene based on the data of the target object; and outputting prompt information matching a preset state in the target scene when the state represents that the target object is in the preset state of the target scene.

20 Claims, 6 Drawing Sheets

(51) Int. Cl.
  *G05D 1/2285*   (2024.01)
  *G05D 1/686*    (2024.01)
  *G05D 1/689*    (2024.01)
  *G05D 105/28*       (2024.01)
  *G05D 105/80*       (2024.01)

(52) U.S. Cl.
  CPC ......... *G05D 1/689* (2024.01); *G05D 2105/28* (2024.01); *G05D 2105/89* (2024.01)

(56) References Cited

FOREIGN PATENT DOCUMENTS

| | | | |
|---|---|---|---|
| CN | 112509168 | * | 3/2021 |
| CN | 112509168 | A | 3/2021 |
| CN | 113204247 | A | 8/2021 |
| CN | 113989503 | * | 1/2022 |
| CN | 113989503 | A | 1/2022 |
| CN | 114627569 | A | 6/2022 |
| CN | 115223075 | A | 10/2022 |
| CN | 115249134 | A | 10/2022 |
| CN | 115272944 | A | 11/2022 |
| CN | 115562349 | A | 1/2023 |
| DE | 102021101102 | A1 | 1/2021 |
| EP | 4414803 | | 8/2024 |
| JP | 2018106394 | A | 7/2018 |
| JP | 2020144760 | A | 9/2020 |
| JP | 202156692 | A | 4/2021 |
| JP | 2023126813 | A | 9/2023 |
| WO | 2018082367 | A1 | 5/2018 |
| WO | 2023058549 | A1 | 4/2023 |

OTHER PUBLICATIONS

Notification on Grant of Patent Right for Invention dated Feb. 1, 2024 in Chinese Patent Application No. 202311677612.X.
Aiello Guiseppe et al., "The Employment of Unmanned Aerial Vehicles for Analyzing and Mitigating Disaster Risks in Industrial Sites", IEEE Transactions of Engineering Management, IEEE, US, vol. 67, No. 3, Jan. 7, 2020, pp. 519-530.
European Search Report dated Mar. 14, 2025 in European Patent Application No. 24215191.8.
Japanese Office Action dated Dec. 26, 2024 in Japanese Patent Application No. 2024-211195.

* cited by examiner

CONTROL METHOD FOR DRONE INSPECTION OF CHEMICAL PRODUCTION PLANT, ELECTRONIC DEVICE AND STORAGE MEDIUM

CROSS-REFERENCE TO RELATED APPLICATIONS

The present application claims priority to Chinese Patent Application No. CN202311677612.X, filed with the China National Intellectual Property Administration on Dec. 7, 2023, the disclosure of which is hereby incorporated herein by reference in its entirety.

TECHNICAL FIELD

The present disclosure relates to the field of chemical fiber intelligent technology, and in particular to a control method and a control apparatus for drone inspection of a chemical production plant.

BACKGROUND

In a chemical production plant, various large devices and various small devices are deployed. In order to maintain the normal operation of the plant, it is usually necessary to inspect the various large devices and various small devices in the plant. However, the existing inspection methods are easily affected by weather, space, device height and the like, so that the inspection efficiency is relatively low or the inspection cannot be performed. Therefore, how to achieve the efficient inspection to improve the safety of the plant has become a technical problem that needs to be solved urgently.

SUMMARY

The present disclosure provides a control method, system and apparatus for drone inspection of a chemical production plant.

According to a first aspect of the present disclosure, provided is a control method for drone inspection of a chemical production plant, including:
  determining a first drone for performing a preset inspection task in a target scene, where the first drone is responsible for the preset inspection task of the chemical production plant;
  obtaining data of a target object collected by the first drone in the target scene;
  determining a state of the target object in the target scene based on the data of the target object; and
  outputting prompt information matching a preset state in the target scene when the state represents that the target object is in the preset state of the target scene;
  where the preset inspection task includes:
  when the target scene belongs to an active inspection scene and the target object is a device, the preset inspection task is a routine inspection task or a sampling inspection task;
  when the target scene belongs to an active inspection scene and the target object is a person, the preset inspection task is a routine inspection task or a sampling inspection task;
  when the target scene belongs to a passive inspection scene and the target object is a device, the preset inspection task is a first dedicated inspection task, and the first dedicated inspection task is an inspection task dedicated to the target object;
  when the target scene belongs to a passive inspection scene and the target object is a person, the preset inspection task is a second dedicated inspection task, and the second dedicated inspection task is formulated based on a requirement of the target object.

According to a second aspect of the present disclosure, provided is a control system for drone inspection of a chemical production plant, including:
  a control device configured to determine a first drone for performing a preset inspection task in a target scene, where the first drone is responsible for the preset inspection task of the chemical production plant; obtain data of a target object collected by the first drone in the target scene; determine a state of the target object in the target scene based on the data of the target object; and output prompt information matching a preset state in the target scene when the state represents that the target object is in the preset state of the target scene; and
  the first drone configured to perform the preset inspection task.

According to a third aspect of the present disclosure, provided is a control apparatus for drone inspection of a chemical production plant, including:
  a first determining module configured to determine a first drone for performing a preset inspection task in a target scene, where the first drone is responsible for the preset inspection task of the chemical production plant;
  an obtaining module configured to obtain data of a target object collected by the first drone in the target scene;
  a second determining module configured to determine a state of the target object in the target scene based on the data of the target object; and
  an output module configured to output prompt information matching a preset state in the target scene when the state represents that the target object is in the preset state of the target scene;
  where the preset inspection task includes:
  when the target scene belongs to an active inspection scene and the target object is a device, the preset inspection task is a routine inspection task or a sampling inspection task;
  when the target scene belongs to an active inspection scene and the target object is a person, the preset inspection task is a routine inspection task or a sampling inspection task;
  when the target scene belongs to a passive inspection scene and the target object is a device, the preset inspection task is a first dedicated inspection task, and the first dedicated inspection task is an inspection task dedicated to the target object;
  when the target scene belongs to a passive inspection scene and the target object is a person, the preset inspection task is a second dedicated inspection task, and the second dedicated inspection task is formulated based on a requirement of the target object.

According to a fourth aspect of the present disclosure, provided is an electronic device, including:
  at least one processor; and
  a memory connected in communication with the at least one processor;
  where the memory stores an instruction executable by the at least one processor, and the instruction, when executed by the at least one processor, enables the at least one processor to execute the method of any embodiment of the present disclosure.

According to a fifth aspect of the present disclosure, provided is a non-transitory computer-readable storage medium storing a computer instruction thereon, and the computer instruction is used to cause a computer to execute the method according to any one of the embodiments of the present disclosure.

According to the technology of the present disclosure, the first drone for performing the preset inspection task in the target scene is firstly determined, then the data of the target object is collected by the first drone, then the state of the target object in the target scene is determined based on the data of the target object, and the prompt information matching the preset state in the target scene is output when the state represents that the target object is in the preset state of the target scene. In this way, there is no need for manual inspection or ground inspection devices, and the effective inspection of the chemical production plant can be completed by the drone, thus improving the efficiency and flexibility of inspection. It is convenient to grasp the state of the target object in the chemical production plant, and also convenient to take corresponding measures when the state of the target object is the abnormal state, thereby ensuring the normal operation and safety of the chemical production plant.

It should be understood that the content described in this summary is not intended to limit critical or essential features of embodiments of the present disclosure, nor is it used to limit the scope of the present disclosure. Other features of the present disclosure will be easily understood through the following description.

BRIEF DESCRIPTION OF THE DRAWINGS

The above and other features, advantages and aspects of various embodiments of the present disclosure will become more apparent with reference to the following detailed description in combination with the accompanying drawings. In the accompanying drawings, the same or similar reference numbers represent the same or similar elements.

DETAILED DESCRIPTION

Figure 1:
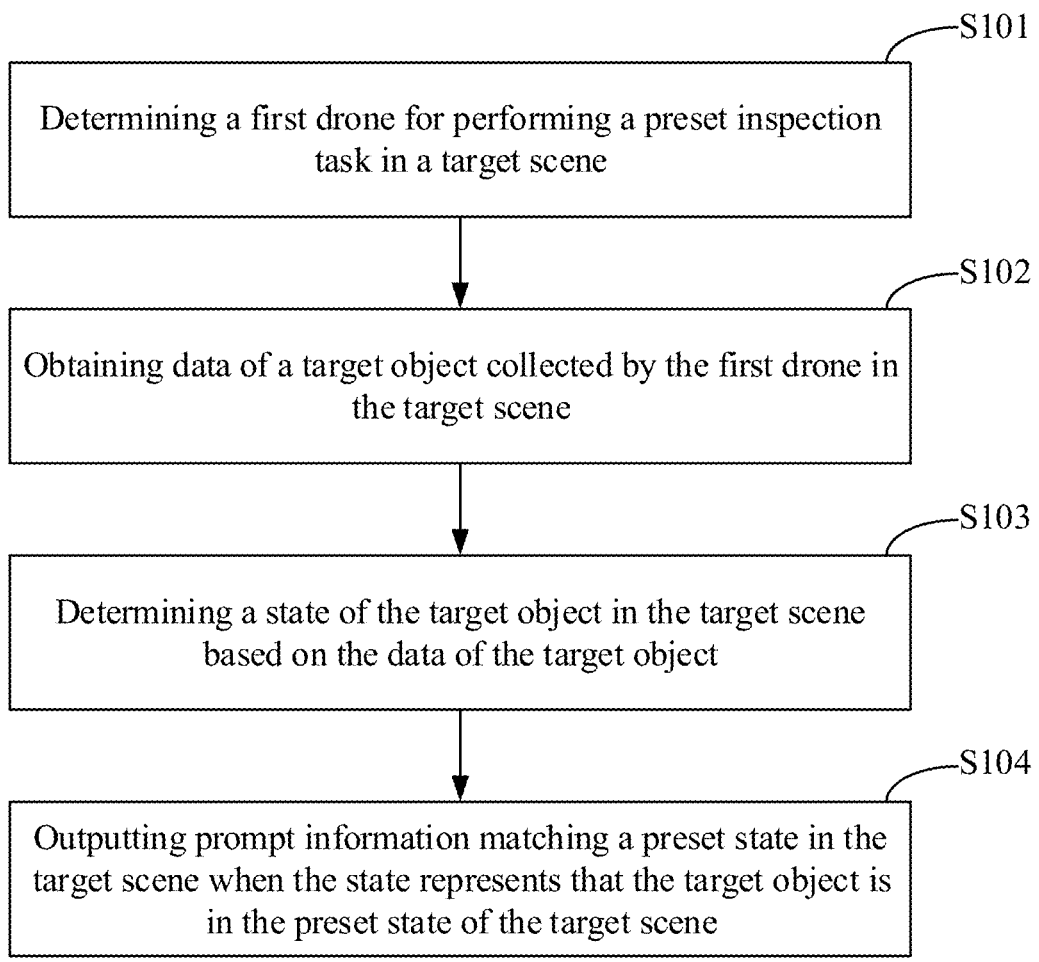
FIG. 1 is a schematic flow chart of a control method for drone inspection of a chemical production plant according to an embodiment of the present disclosure.

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope and spirit of the present disclosure. Likewise, for clarity and conciseness, descriptions of well-known functions and structures are omitted in the following descriptions.

The terms such as "first", "second" and "third" in the embodiments of the specification, the claims and the above-mentioned drawings in the present disclosure are used to distinguish the similar objects, but not necessarily to describe a particular order or sequence. In addition, the terms "include" and "have" and any variations thereof are intended to cover a non-exclusive inclusion. For example, a method, system, product or device containing a series of steps or units is not necessarily limited to those steps or units listed clearly, but may include other steps or units that are not listed clearly or that are inherent to the process, method, product or device.

In the relevant technology, the area of a chemical production plant is relatively large, resulting in the long route and unstable efficiency of manual inspection, and difficulty in inspection in bad weather. Moreover, various large devices and various small devices are deployed in the chemical production plant. Some large devices are relatively tall, have limited space and make a lot of noise, making it difficult for manual inspection to obtain the device state and device data, and putting the devices in the "passive state". The existing inspection method has the defects of long time intervals, blind spots in inspection, and strong subjectivity. In addition, the manual inspection requires high skills of inspectors. There are hazardous factors such as noise and toxic gases in the chemical production plant, and there are great safety hazards for inspectors.

In the related technology, for some key devices in the chemical production plant, the determination of the device state and the safe operation within the maintenance cycle mainly relies on regular inspection by team members or monitoring through Supervisory Control And Data Acquisition (SCADA), and the inspection efficiency is relatively low. In addition, when a worker needs to work at height, the working state of the worker needs to be monitored in real time to ensure the safety of the worker during work. However, the method of deploying cameras has great limitation and poor flexibility, and cannot monitor the states of all workers in real time.

In order to at least partially solve one or more of the above problems and other potential problems, the present disclosure proposes a control method, system and apparatus for drone inspection of a chemical production plant. Using drones to inspect the chemical production plant can improve the inspection efficiency, thereby ensuring the normal operation and safety of the chemical production plant.

An embodiment of the present disclosure provides a control method for drone inspection of a chemical production plant. FIG. 1 is a schematic flow chart of the control method for drone inspection of the chemical production plant according to the embodiment of the present disclosure. The control method for drone inspection of the chemical production plant can be applied to a control apparatus for drone inspection of a chemical production plant. The control apparatus for drone inspection of the chemical production plant is located on an electronic device. This electronic device includes but is not limited to a fixed device and/or a mobile device. For example, the fixed device includes but is not limited to a server, and the server may be a cloud server or an ordinary server. For example, the mobile device includes but is not limited to a mobile phone, a tablet, etc. In some possible implementations, the control method for drone inspection of the chemical production plant may also be implemented by a processor calling a computer-readable instruction stored in a memory. As shown in FIG. 1, the control method for drone inspection of the chemical production plant includes:

S101: determining a first drone for performing a preset inspection task in a target scene, where the first drone is responsible for the preset inspection task of the chemical production plant;

S102: obtaining data of a target object collected by the first drone in the target scene;

S103: determining a state of the target object in the target scene based on the data of the target object; and S104: outputting prompt information matching a preset state in the target scene when the state represents that the target object is in the preset state of the target scene.

In an embodiment of the present disclosure, the target scene includes but is not limited to operation scenes in limited space, aerial work scenes, certain special operation scenes, production inspection scenes, packaging inspection scenes, etc. If the chemical production plant is a plant that produces a certain material, the target scene may be divided into multiple scenes according to the distribution of the chemical production plant for producing the certain material, or may be divided into multiple scenes according to the packaging process of the chemical production plant for producing the certain material; and the chemical production plant for the certain material may also be intelligently divided into multiple scenes according to the control device. The present disclosure does not limit the type of the material. In an embodiment of the present disclosure, the preset inspection task may be a task generated by the control device according to the target scene; or the preset inspection task may be a task generated according to a manually input instruction. The above is only an exemplary description and is not intended to limit all possible ways of obtaining the preset inspection task, but it is not exhaustive here.

Exemplarily, the control device divides a chemical production plant for chemical fiber production into multiple scenes based on the plant map: scene 1, outside the plant; and scene 2, inside the plant. The inspection tasks generated by the control device according to the scene 1 are device inspection tasks outside the plant, safety inspection tasks outside the plant, and anomaly inspection tasks outside the plant; and the inspection tasks generated by the control device according to the scene 2 are device inspection tasks inside the plant, safety inspection tasks inside the plant, and anomaly inspection tasks inside the plant. Here, the preset inspection task may include inspection task name, inspection task content, and inspection task route, etc. Here, the inspection task route is obtained based on the layout map of the chemical production plant stored in the data source of the control device.

Figure 2:
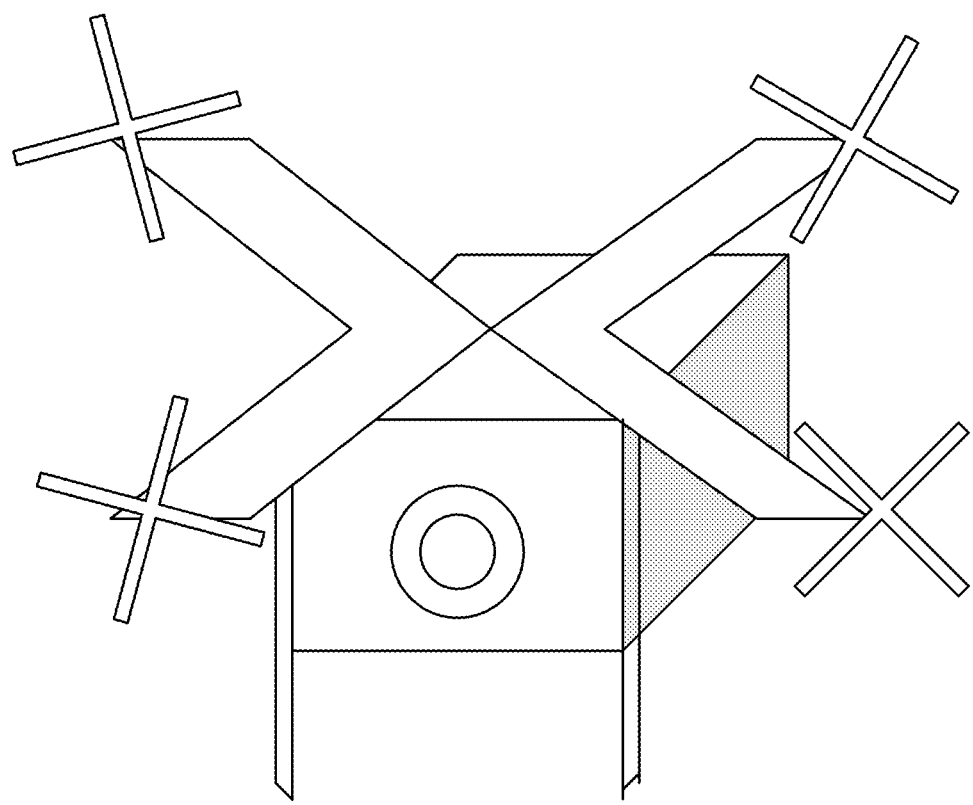
FIG. 2 is a schematic diagram of a first drone according to an embodiment of the present disclosure.

FIG. 2 shows a schematic diagram of the first drone. As shown in FIG. 2, the first drone may be a light-load drone, which can carry light loads. The loads of the light-load drone are usually from a few grams to several hundred grams. The light-load drone carries a high-definition camera, a trumpet, etc. Specifically, the light-load drone may also carry sensors, such as a temperature sensor, a microphone, a gas detection sensor, an altitude sensor, a speed sensor, etc., according to the preset inspection tasks; and the light-load drone may also carry other devices, such as a laser scanner, a Global Positioning System (GPS), etc., according to the preset inspection task. The light-load drone may be used as a data collector to provide training data for model training in the early stage, and may be used as input for real-time monitoring later. Specifically, the training data collected by the first drone is obtained, where the training data is at least one of image data, voice data and video data; and the training data is input into a model to be trained for training to obtain a target model.

In an embodiment of the present disclosure, the chemical production plant is deployed with a variety of large devices, a variety of small devices and a variety of special devices.

In an embodiment of the present disclosure, the target object includes but is not limited to a device, a person, an animal, a floating object in the air, etc. Here, the target object may be preset in the control device. If the target object is set to a person, the first drone only collects data related to the person.

In some embodiments, the data of the target object may include image data, voice data, video data, sensor data, location data, etc. Here, the data of the target object collected by the first drone may be directly stored in the data source of the first drone, or may be directly uploaded to the control device.

In some embodiments, the prompt information is obtained by the first drone based on the target object and the target scene. The prompt information is used to indicate the current state of the target object. Exemplarily, if the target object is an inspector, the prompt information about emergency is output, and the prompt information may include: calling person, emergency phone number, medical room location and other information; if the target object is a device and the device makes an abnormal sound and needs to be repaired, the prompt information about repair is output, and the prompt information may be recommendation of repair person, repair tool, repair plan and other information; if the target object is workshop humidity, the prompt information of the workshop humidity is output when the workshop humidity is lower than a preset value, and the prompt information may include: current workshop humidity, ideal workshop humidity, humidification area and humidification amount, and other information; if the target object is an abnormal item, the prompt information about cleanup is output when a plastic bag or other floating object is detected above the storage area, and the prompt information may include: the type of the abnormal item, the impact index of the abnormal item on plant safety, the list of cleanup persons, the urgency of cleanup, and other information.

In some embodiments, the step of outputting the prompt information matching the preset state in the target scene includes: sending the prompt information to a device near the target object; or sending the prompt information to a control system; or sending the prompt information to an executable device or person. The prompt information may be set in different prompt states, such as voice prompt, alarm prompt, light prompt, etc. Here, the prompt information may be prompt information of the normal working state of the target object, or may be prompt information of the abnormal working state of the target object. Specifically, when the prompt information is the prompt information of the normal working state of the target object, the prompt information may be displayed in the background; when the prompt information is the prompt information of the abnormal working state of the target object, the prompt information may be directly displayed on a front-end page while other prompt states may be attached.

Thus, the first drone for performing the preset inspection task in the target scene is firstly determined, then the data of the target object is collected by the first drone, then the state of the target object in the target scene is determined based on the data of the target object, and the prompt information matching the preset state in the target scene is output when the state represents that the target object is in the preset state of the target scene. In this way, there is no need for manual inspection or ground inspection devices, and the effective inspection of the chemical production plant can be completed by the drone, thus improving the efficiency and flexibility of inspection. It is convenient to grasp the state of the target object in the chemical production plant, and also convenient to take corresponding measures when the state of the target object is the abnormal state, thereby ensuring the normal operation and safety of the chemical production plant.

In some embodiments, the follow instruction may be a voice instruction or a motion instruction sent by the inspector to the drone.

In some embodiments, the step of determining the first drone for performing the preset inspection task in the target scene includes: in response to receiving a follow instruction sent by a drone, determining the drone that sends the follow instruction as the first drone, where the follow instruction is an instruction sent by an inspector to the drone that sends the follow instruction and is used to instruct the drone to follow the inspector to work, and the follow instruction includes information characterizing the preset inspection task.

In some embodiments, the follow instruction may also be an instruction generated by the control system according to the inspection task. The follow instruction may include information such as a follow object, a follow route, and an inspection object. Here, the follow object information may be one or more. If there are a plurality of follow objects, priorities may be set for the plurality of follow objects, and the drone will preferentially follow a follow object with a higher priority. Here, determining the follow object may include: obtaining images of the follow objects, and determining a target follow object based on the images of the follow objects; or obtaining features of the follow objects, and determining a target follow object based on the features of the follow objects.

In some embodiments, the follow instruction may be an instruction generated by the inspector directly calling a nearby idle drone; and the drone may directly receive the follow instruction and report the follow status and the follow object to the system. Specifically, the drone needs to collect an image of the inspector; identify the image to obtain an identification result; and analyze the identification result to determine whether the inspector has the authority. If the inspector has the authority, the drone receives the follow instruction and reports it to the system, updates the current working state from the idle state to the working state, and uploads the motion trajectory in real time; or the drone uploads the follow instruction of the inspector to the control system, and follows the inspector to perform operations after receiving the permission to the follow instruction returned by the control system based on the follow instruction.

In this way, in response to receiving the follow instruction sent by the drone, the drone that sends the follow instruction is determined as the first drone. The inspection task can be flexibly assigned to the drone, improving the utilization rate of drone inspection and thus improving the inspection efficiency.

In some embodiments, the step of determining the first drone for performing the preset inspection task in the target scene includes: in response to receiving an operation requirement sent by a terminal, determining the first drone for performing the preset inspection task in the target scene for the terminal from candidate drones based on the operation requirement and state information of the candidate drones, where the operation requirement includes information characterizing the preset inspection task.

In some embodiments, the terminal may be a mobile phone, a laptop computer, a personal computer or other device. The terminal may be a dedicated terminal device within the control system for drone inspection of the chemical production plant; or may be a terminal device associated with the control system for drone inspection of the chemical production plant.

In some embodiments, the operation requirement may be an operation requirement generated by manually input information; or may be an operation requirement generated by the control device based on the current working data of each device; or may be an operation requirement preset by the control system for drone inspection of the chemical production plant. The operation requirement may include: the quantity of drones required, models of drones required, working time, working duration, devices carried by drones, and other information.

In some embodiments, the state information of the drone may include working state information of the drone, information of devices carried by the drone, etc. Here, the working state information of the drone may include: "working", "on standby", "under maintenance", "charging", etc.; and the information of devices carried by the drone may include: types of devices carried by the drone, models of devices carried by the drone, the quantity of devices carried by the drone, etc.

In some embodiments, the candidate drones may be all the drones that can be dispatched at the chemical production site, or all or some of the drones that are idle at the chemical production site, or a certain type of drones that are idle at the chemical production site, such as light-load drones.

In this way, in response to receiving the operation requirement sent by the terminal, the first drone is determined based on the operation requirement and the state information of the candidate drones. The inspection task can be flexibly assigned to the drone, improving the utilization rate of drone inspection and thus improving the inspection efficiency.

In some embodiments, the step of determining the first drone for performing the preset inspection task in the target scene includes: determining the first drone for performing the preset inspection task in the target scene from candidate drones according to the state information of the candidate drones in combination with an inspection cycle.

In some embodiments, the inspection cycle may be determined by the control system for drone inspection of the chemical production plant according to the chemical production operation condition, and different preset inspection tasks may also be determined by the control system for drone inspection of the chemical production plant according to the chemical production operation condition.

The quantity of first drones is not limited here. N first drones may follow N workers, or M first drones may follow one worker. The M first drones may be located around the worker respectively to perform data collection for different inspection tasks.

In this way, the first drone for performing the preset inspection task in the target scene is determined from the candidate drones according to the state information of the candidate drones in combination with the inspection cycle, thus improving the efficiency of the drone in performing the inspection task, and thereby ensuring the safety of the chemical production plant.

In some embodiments, the preset inspection task may include: inspection outside the plant, inspection inside the plant, inspection of production safety hazards, and inspection of personnel operations.

In some embodiments, the preset inspection task includes at least one of: when the target scene belongs to an active inspection scene and the target object is a device, the preset inspection task is a routine inspection task or a sampling inspection task; when the target scene belongs to an active inspection scene and the target object is a person, the preset inspection task is a routine inspection task or a sampling inspection task; when the target scene belongs to a passive inspection scene and the target object is a device, the preset inspection task is a first dedicated inspection task, and the first dedicated inspection task is an inspection task dedicated to the target object; or when the target scene belongs to a passive inspection scene and the target object is a person, the preset inspection task is a second dedicated inspection task, and the second dedicated inspection task is formulated based on a requirement of the target object.

In some embodiments, the active inspection scene may include a routine inspection task and a sampling inspection task. The target object of the active inspection scene may be a person or device. The routine inspection task is a task preset by the control system for drone inspection of the chemical production plant according to the actual situation. That is, when it is detected that the triggering condition of the routine inspection task is met, the routine inspection task is issued.

Here, the triggering condition may include: triggering the routine inspection task within a preset time, triggering the routine inspection task at a fixed time, etc. The sampling inspection task is a task randomly issued by the control system for drone inspection of the chemical production plant according to the actual situation. Here, the content of the routine inspection task is preset, and the content of the sampling inspection task is randomly generated.

In some embodiments, the passive inspection scene may include: receiving alarm information sent by device A, receiving an active call from inspector a, etc.

In some embodiments, the passive inspection scene may include a first dedicated inspection task and a second dedicated inspection task. The first dedicated inspection task is an inspection task dedicated to the target object. Specifically, if the target object is a device, the first dedicated inspection task is a task set based on the attribute of the device; for example, an inspection task set for temperature detection of the device. The second dedicated inspection task is an inspection task generated based on the requirement of the target object. Specifically, if the target object is a person, the second dedicated inspection task is a task generated based on the requirement of the person; for example, the worker issues an inspection task of "performing pressure detection on L devices".

In some embodiments, the dedicated inspection task may include: the drone leads the way for the inspector; or the drone executes instructions of the inspector to perform tasks such as taking pictures, recording videos, analyzing data, etc.

In some embodiments, the preset state includes a device abnormal state, and the target object includes a target device; and the step of outputting the prompt information matching the preset state in the target scene when the state represents that the target object is in the preset state of the target scene includes: outputting prompt information matching the device abnormal state in the target scene when the state represents that the target device is in the device abnormal state of the target scene.

In some embodiments, the device abnormal state may include: the device stops running, the device runs incorrectly, some parts of the device fall off, the device makes abnormal sounds, and the device vibrates abnormally, etc.

In some embodiments, the target scene may be a scene limited by a space factor; or may be a scene limited by a height factor; or may be a scene limited by special environment. Exemplarily, the target scene is rainstorm weather, and the target object is a large device outside the plant. A sampling inspection task is generated based on the target scene and the target object; a first drone for performing the sampling inspection task in the target scene is determined; the data of the target object collected by the drone is obtained; the state of the target object in the target scene is determined based on the data of the target object; when the state represents that the target object is in the device abnormal state of the target scene, the alarm prompt information is uploaded to the system; when the state represents that the target object is in the device normal state of the target scene, the task continues to be executed.

In this way, when the state represents that the target device is in the device abnormal state of the target scene, the prompt information matching the device abnormal state in the target scene is output, and the state information of the target object can be accurately obtained in the complex scene, helping improve the work efficiency of the chemical production plant.

In an embodiment of the present disclosure, the preset state includes a person abnormal state, and the target object includes a target person; and the step of outputting the prompt information matching the preset state in the target scene when the state represents that the target object is in the preset state of the target scene includes: outputting prompt information matching the person abnormal state in the target scene when the state represents that the target person is in the person abnormal state of the target scene.

In some embodiments, the person abnormal state may include: the worker is in a dangerous environment, the worker behaves abnormally, a safety protection device worn by the worker is loose, and the worker is not wearing a safety protection device, etc.

In some embodiments, the target person may be a worker of this plant; or may be a worker not belonging to this plant, such as a person who breaks into the plant without authorization, etc.

In some embodiments, the target scene may be a scene limited by a space factor; or may be a scene limited by a height factor; or may be a scene limited by a special environment. Exemplarily, the target scene is a high tower, and the target object is a worker working on the high tower outside the plant. A routine inspection task is generated based on the target scene and the target object; a first drone for performing the routine inspection task in the target scene is determined; the data of the target object collected by the drone is obtained; the state of the target object in the target scene is determined based on the data of the target object; when the state represents that the target object is in the person abnormal state of the target scene, the alarm prompt information is uploaded to the system; when the state represents that the target object is in the person normal state of the target scene, the task continues to be executed.

In this way, when the state represents that the target person is in the person abnormal state of the target scene, the prompt information matching the person abnormal state in the target scene is output, and the state information of the target object can be accurately obtained in the complex scene, helping improve the safety of workers in the chemical production plant.

In an embodiment of the present disclosure, the step of determining the state of the target object in the target scene based on the data of the target object includes: obtaining a known corresponding relationship, where the known corresponding relationship at least includes a relationship between each state of the target object and corresponding interval data; and analyzing the state corresponding to the data of the target object in the target scene based on the known corresponding relationship. Here, the state may include an abnormal state or a normal state.

In some embodiments, the known corresponding relationship is used to record the data information of the target object in various states. Here, the data information may be a fixed value, a numerical interval, or a plurality of numerical intervals. The known corresponding relationship may be presented in a table. The known corresponding relationship is usually stored in the data source of the control system for drone inspection of the chemical production plant. Here, the known corresponding relationship may be added, deleted, modified and updated.

In this way, the known corresponding relationship can provide data support for determining the state of the target object in the target scene, helping improve the accuracy in determining the target object in the target scene.

In an embodiment of the present disclosure, the step of determining the state of the target object in the target scene based on the data of the target object includes: inputting the data of the target object in the target scene into a state analysis model, where the state analysis model is obtained by training based on a known corresponding relationship and is used to predict the state of the target object in the target scene; and obtaining the state of the target object in the target scene output by the state analysis model.

In some embodiments, the training process of the state analysis model includes: obtaining the training data, which is a known corresponding relationship; and inputting the training data into a model to be trained for training to obtain the state analysis model. The state analysis model is used to predict the state of the target object in the target scene.

In some embodiments, the data of the target object in the target scene is collected by the drone. The data of the target object in the target scene may be image data, audio data, text data, and video data. Exemplarily, the data of the target object collected by the drone is an image in which a device part falls off. The data of the target object is input into the state analysis model to obtain an analysis result, and the analysis result is that the device is in an abnormal state.

In this way, the state analysis model can be used to predict the state of the target object based on the data of the target object collected by the drone, thus improving the anomaly processing efficiency.

In an embodiment of the present disclosure, the control method for drone inspection of the chemical production plant further includes: establishing a corresponding relationship between the data of the target object and the state of the target object in the target scene; and updating the known corresponding relationship based on the corresponding relationship.

In some embodiments, the establishment of the corresponding relationship between the data of the target object and the state of the target object in the target scene can be achieved by monitoring and recording the operation process through the drone. The drone monitors and records the operation process, obtains the operation experience knowledge of the target object in the target scene, and stores the operation experience knowledge in an experience database. The experience database is located at the terminal in the control system for drone inspection of the chemical production plant.

In some embodiments, the data of the target object in the target scene is collected by the drone, where the data may be image data, video data or audio data; the data of the target object is analyzed to obtain the state of the target object; a known corresponding relationship is obtained; the known corresponding relationship is compared with the data and state of the target object to obtain a comparison result; and the known corresponding relationship is updated based on the comparison result.

In this way, the data of the target object in the target scene collected by the drone is updated in real time, thus improving the accuracy in determining the state of the target object.

In an embodiment of the present disclosure, the control method for drone inspection of the chemical production plant further includes: receiving an item demand sent by the first drone; and dispatching a second drone for the first drone based on the item demand, so that the second drone transports a target item to an inspector corresponding to the first drone based on the item demand.

Here, the target item is an item indicated in the item demand.

Figure 3:
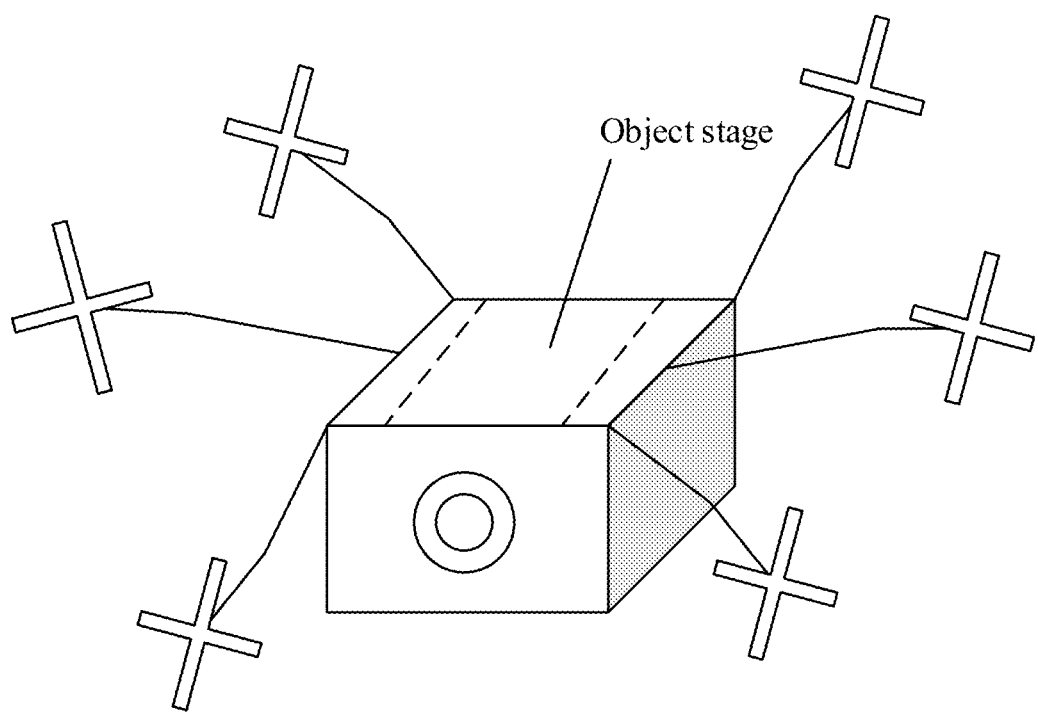
FIG. 3 is a schematic diagram of a second drone according to an embodiment of the present disclosure.

In some embodiments, the item demand may include models of items required, the quantity of items required, and positions of items required. FIG. 3 shows a schematic diagram of the second drone. As shown in FIG. 3, the second drone is a drone carrying items. The second drone is used to transport items required for the inspector.

In practical applications, the second drone can communicate directly with the first drone. The second drone directly receives the item demand sent by the first drone; the second drone determines the location of the target item based on the item demand; the second drone notifies the distributor of preparing the target item; the second drone determines an optimal route, where the optimal route is the shortest route or the safest route taken by the second drone to fly to the first drone; when detecting that the target item has been loaded onto the second drone, the target item is transported to the inspector corresponding to the first drone based on the optimal route. At the same time, the second drone can report its own state information to the system background in real time, so that the system background records the state of the second drone in real time. Here, the second drone may determine whether the target object is loaded onto the second drone based on the collected voice data. For example, when the distributor loads the target item onto the object stage of the second drone, he says "item XX has been loaded and ready to go". After recognizing the voice data, the second drone determines that the target item has been loaded onto the second drone. Here, the second drone may determine whether the target item is loaded onto the second drone based on a weight sensor, where the weight sensor is located on the second drone. For example, the second drone detects the weight at the first moment and the weight at the second moment through the weight sensor, and determines that the target object has been loaded onto the second drone when the weight change matches the weight of the target object. Here, the second drone may collect the image data on the object stage of the second drone using a camera, and determine that the target object has been loaded onto the second drone when recognizing the target object based on the image data.

Figure 4:
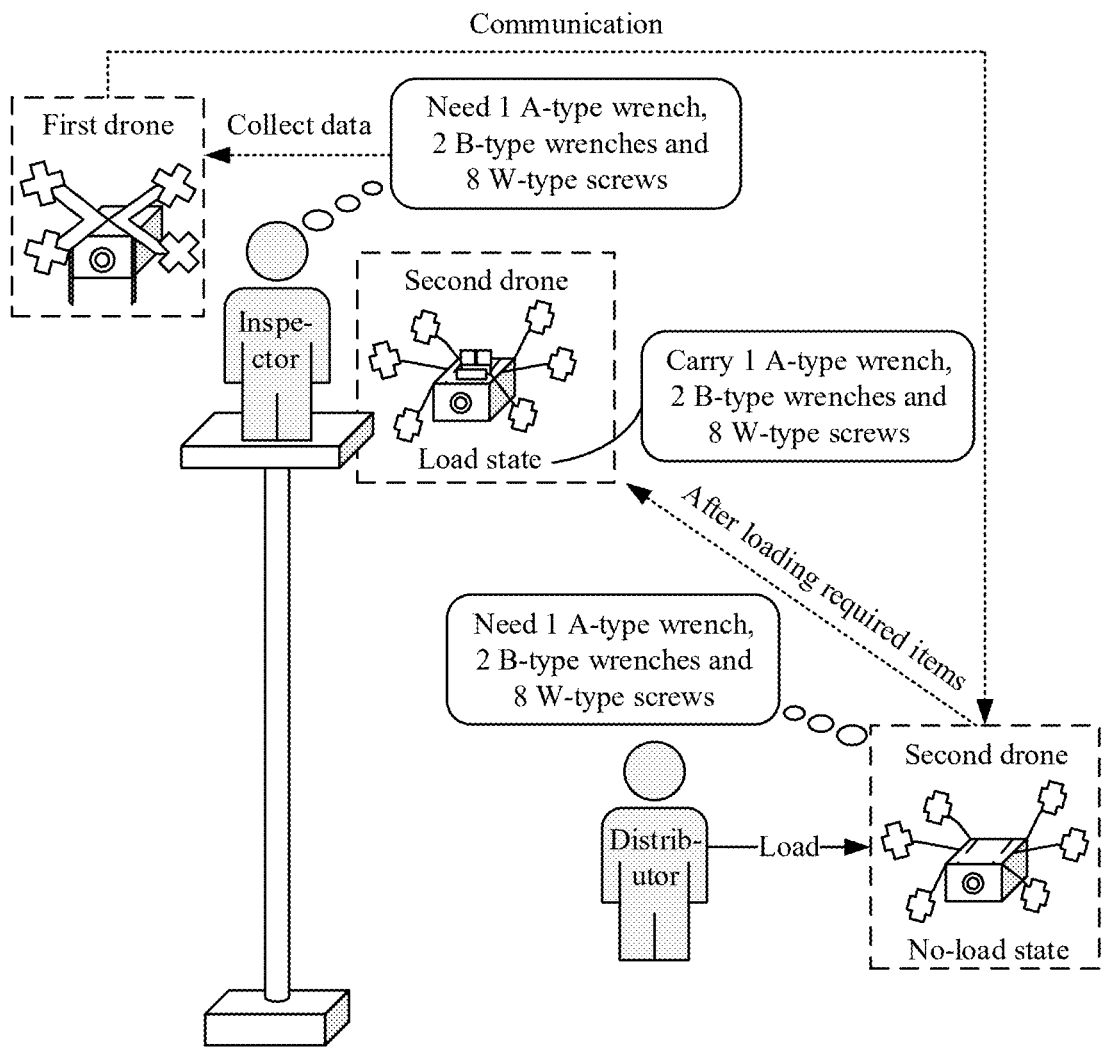
FIG. 4 is a schematic diagram of coordinated operation of the first drone and the second drone according to an embodiment of the present disclosure.

FIG. 4 shows a schematic diagram of coordinated operation of the first drone and the second drone. As shown in FIG. 4, the target scene is aerial work, and the target object is an inspector. The inspector finds that the tools he carries are insufficient, and can call the first drone and issue a voice instruction "I need 1 A-type wrench, 2 B-type wrenches and 8 W-type screws". The first drone collects the audio of the inspector through an earpiece, converts the audio into an instruction text, and sends the instruction text to the second drone. The second drone receives the instruction text sent by the first drone, and executes the task based on the instruction text. Specifically, the second drone determines the positions of the items based on the instruction text, flies to the item storage area, and then broadcasts the required items, so that the distributor prepares the goods based on the broadcast voice and loads the required items onto the second drone. Here, the instruction text may also include: the position of the first drone, the task route and other information; and the first drone and the second drone may communicate with each other. The present disclosure does not limit the communication method between the first drone and the second drone.

In some embodiments, the second drone also has a voice recognition function, and can recognize the inspector and recognize the instructions issued by the inspector. For example, when the second drone is loaded with the required items and arrives near the inspector, the inspector can give a voice command "fly lower".

In this way, the scheme of using the first drone in coordination with the second drone can improve the intelligence of drone inspection of the chemical production plant, thereby improving the efficiency of drone inspection of the chemical production plant.

In an embodiment of the present disclosure, the first drone is provided with a first voice recognition model, the target object includes an inspector, and the control method for drone inspection of the chemical production plant further includes: sending the item demand to a system background if the item demand of the inspector is recognized by the first voice recognition model when the first drone receives voice of the inspector.

In some embodiments, when the first drone receives the voice of the inspector, if the item demand of the inspector is recognized by the first voice recognition model, the item demand is sent to the system background; and the position of the first drone and the identifier of the inspector may also be sent.

Here, the first voice recognition model can extract and recognize the audio of persons, and the recognized audio may be voices of persons from different regions or voices in other languages.

In this way, when the first drone receives the voice of the inspector, if the item demand of the inspector is recognized by the first voice recognition model, the item demand is sent to the system background. The instructions from the inspector can be collected in real time, helping improve the efficiency of the drone in performing the inspection task.

In an embodiment of the present disclosure, the first drone is provided with a second voice recognition model, the target object includes a target device, and the control method for drone inspection of the chemical production plant further includes: inputting collected sound of the target device into the second voice recognition model in a process of performing the preset inspection task by the first drone, and sending the item demand to a system background if the item demand matching a fault of the target device is analyzed by the second voice recognition model.

In some embodiments, when the first drone receives the voice of the inspector, if the item demand matching the fault of the target device is analyzed by the second voice recognition model, the item demand is sent to the system background; and the position of the first drone and the identifier of the inspector may also be sent.

In some embodiments, the second voice recognition model can extract the audio of the device and analyze the audio of the device to determine the state of the device in the target scene. Specifically, the second voice recognition model can also remove noise in the audio of the device.

Here, the analysis of the audio of the device may include the following aspects: the volume of the sound of device operation, the frequency of device operation, and the fluctuation of device operation. Some special devices have different volumes, frequencies and fluctuations in different working states. Moreover, when the device is in the abnormal state, the sound, frequency and fluctuation of the device also vary. The information such as required repair tools and damaged components may be obtained by analyzing the audio of the device.

In this way, the collected sound of the target device is input into the second voice recognition model in the process of performing the preset inspection task by the first drone, and the item demand is sent to the system background if the item demand matching the fault of the target device is analyzed by the second voice recognition model, thus providing data support for determining the device state and helping improve the work efficiency of the inspector.

In an embodiment of the present disclosure, the control method for drone inspection of the chemical production plant further includes: determining an inspection path for the first drone to perform the preset inspection task; and sending the inspection path to the first drone, so that the first drone performs the preset inspection task based on the inspection path.

In some embodiments, the inspection path includes: the name of the device to be inspected, the inspection order, and the duration of stay.

Here, the inspection path is the optimal inspection path formulated for the first drone, the inspection path may be obtained through a route planning model, and the route planning model generates the inspection path of the first drone based on the state information of each drone, known inspection results returned by other drones, and the inspection requirement.

In this way, the inspection path for the first drone to perform the preset inspection task is determined; and the inspection path is sent to the first drone so that the first drone performs the preset inspection task based on the inspection path, thus improving the efficiency of drone inspection.

In an embodiment of the present disclosure, the target object includes an inspector, and the control method for drone inspection of the chemical production plant further includes: receiving a control instruction of the inspector sent by the first drone and an execution record of the first drone for the control instruction, where the control instruction is received in a process of performing the preset inspection task by the first drone, and the first drone recognizes that the inspector has control authority to send the control instruction; and storing the control instruction of the inspector and the execution record corresponding to the control instruction.

In some embodiments, the execution record may record the work process, work duration and work result of the worker.

In some embodiments, the drone will execute instructions of the inspector only when the inspector has the authority to control the drone. For example, when the inspector A has the authority to control the drone, the inspector A can issue instructions such as "Take a top view of me repairing device XX", "Take a front view of me repairing device XX", "Take a side view of device XX", "Record sound of device XX for 10 seconds", and "Record a video of me repairing device XX".

In this way, the reception of the control instruction of the inspector sent by the first drone and the execution record of the first drone for the control instruction can record the work situation of the inspector, help record the operating specification of the inspector, and provide experience data for subsequent work.

Figure 5:
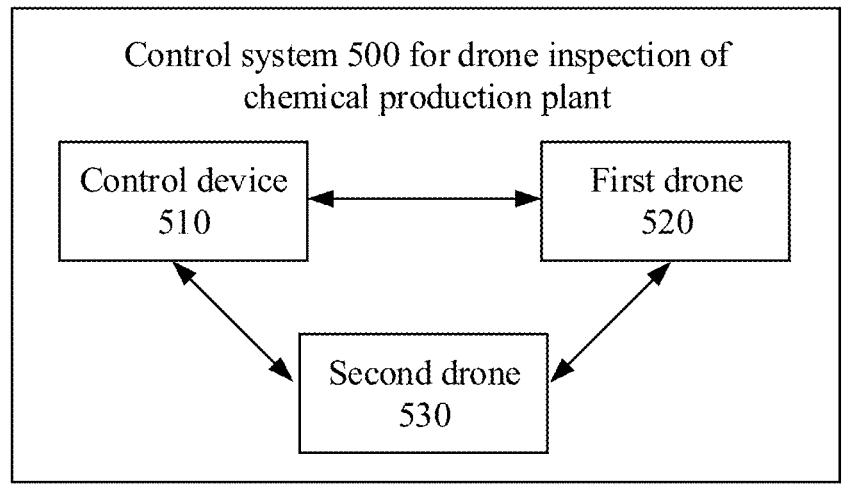
FIG. 5 is a schematic block diagram of a control system 500 for drone inspection of a chemical production plant according to an embodiment of the present disclosure.

An embodiment of the present disclosure further proposes a control system for drone inspection of a chemical production plant that can execute the above-mentioned control method for drone inspection of the chemical production plant. FIG. 5 is a schematic block diagram of the control system 500 for drone inspection of the chemical production plant according to the embodiment of the present disclosure. As shown in FIG. 5, the control system 500 for drone inspection of the chemical production plant includes: a control device 510 configured to determine a first drone for performing a preset inspection task in a target scene, where the first drone 520 is responsible for the preset inspection task of the chemical production plant; obtain data of a target object collected by the first drone in the target scene; determine a state of the target object in the target scene based on the data of the target object; and output prompt information matching a preset state in the target scene when the state represents that the target object is in the preset state of the target scene; and the first drone 520 configured to perform the preset inspection task.

In this way, the use of the drone to inspect the chemical production plant can improve the inspection efficiency, thereby ensuring the normal operation and safety of the chemical production plant.

In an embodiment of the present disclosure, as shown in FIG. 5, the control system for drone inspection of the chemical production plant further includes: a second drone 530 configured to receive a dispatch instruction of the control device 510; and transport a target item to an inspector corresponding to the first drone 520 based on the dispatch instruction; where the dispatch instruction is determined by the control device 510 based on an item demand sent by the first drone 520.

Here, the inspector is a person followed by the first drone.

In this way, the first drone and the second drone can work in coordination with each other, improving the intelligence of drone inspection of the chemical production plant, and thus improving the efficiency of drone inspection of the chemical production plant.

It should be understood that the flow charts shown in FIGS. 2 to 5 are only illustrative and not restrictive. The above processes can be adaptively adjusted or changed according to operational requirements, which will not be described again here. Those skilled in the art can make various obvious changes and/or replacements based on the examples of FIGS. 2 to 5, and the obtained technical solutions still belong to the disclosure scope of the embodiments of the present disclosure.

Figure 6:
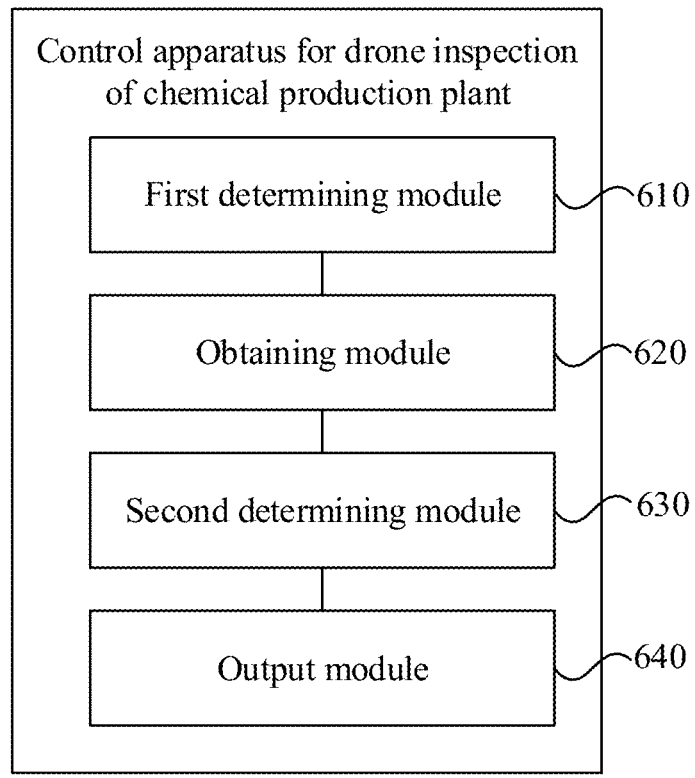
FIG. 6 is a structural schematic diagram of a control apparatus for drone inspection of a chemical production plant according to an embodiment of the present disclosure.

An embodiment of the present disclosure provides a control apparatus for drone inspection of a chemical production plant. As shown in FIG. 6, the control apparatus for drone inspection of the chemical production plant may include:
a first determining module 610 configured to determine a first drone for performing a preset inspection task in a target scene, where the first drone is responsible for the preset inspection task of the chemical production plant;
an obtaining module 620 configured to obtain data of a target object collected by the first drone in the target scene;
a second determining module 630 configured to determine a state of the target object in the target scene based on the data of the target object; and
an output module 640 configured to output prompt information matching a preset state in the target scene when the state represents that the target object is in the preset state of the target scene.

Here, the preset inspection task includes:
when the target scene belongs to an active inspection scene and the target object is a device, the preset inspection task is a routine inspection task or a sampling inspection task;
when the target scene belongs to an active inspection scene and the target object is a person, the preset inspection task is a routine inspection task or a sampling inspection task;
when the target scene belongs to a passive inspection scene and the target object is a device, the preset inspection task is a first dedicated inspection task, and the first dedicated inspection task is an inspection task dedicated to the target object;
when the target scene belongs to a passive inspection scene and the target object is a person, the preset inspection task is a second dedicated inspection task, and the second dedicated inspection task is formulated based on a requirement of the target object.

In some embodiments, the first determining module 610 includes: a first determining submodule configured to, in response to receiving a follow instruction sent by a drone, determine the drone that sends the follow instruction as the first drone, where the follow instruction is an instruction sent by an inspector to the drone that sends the follow instruction and is used to instruct the drone to follow the inspector to work, and the follow instruction includes information characterizing the preset inspection task.

In some embodiments, the first determining module 610 includes: a second determining submodule configured to, in response to receiving an operation requirement sent by a terminal, determine the first drone for performing the preset inspection task in the target scene for the terminal from candidate drones based on the operation requirement and state information of the candidate drones, where the operation requirement includes information characterizing the preset inspection task.

In some embodiments, the first determining module 610 includes: a third determining submodule configured to determine the first drone for performing the preset inspection task in the target scene from candidate drones according to state information of the candidate drones in combination with an inspection cycle.

In some embodiments, the preset inspection task includes at least one of: when the target scene belongs to an active inspection scene and the target object is a device, the preset inspection task is a routine inspection task or a sampling inspection task; when the target scene belongs to an active inspection scene and the target object is a person, the preset inspection task is a routine inspection task or a sampling inspection task; when the target scene belongs to a passive inspection scene and the target object is a device, the preset inspection task is a first dedicated inspection task, and the first dedicated inspection task is an inspection task dedicated to the target object; and/or when the target scene belongs to a passive inspection scene and the target object is a person, the preset inspection task is a second dedicated inspection task, and the second dedicated inspection task is formulated based on a requirement of the target object.

In some embodiments, the preset state includes a device abnormal state, and the target object includes a target device; where the output module 640 includes: a first output submodule configured to output prompt information matching the device abnormal state in the target scene when the state represents that the target device is in the device abnormal state of the target scene.

In some embodiments, the preset state includes a person abnormal state, and the target object includes a target person; where the output module 640 includes: a second output submodule configured to output prompt information matching the person abnormal state in the target scene when the state represents that the target person is in the person abnormal state of the target scene.

In some embodiments, the second determining module 630 includes: a first obtaining submodule configured to obtain a known corresponding relationship, where the known corresponding relationship at least includes a relationship between each state of the target object and corresponding interval data; and an analysis submodule configured to analyze the state corresponding to the data of the target object in the target scene based on the known corresponding relationship.

In some embodiments, the second determining module 630 includes: an input submodule configured to input the data of the target object in the target scene into a state analysis model, where the state analysis model is obtained by training based on a known corresponding relationship and is used to predict the state of the target object in the target scene; and a second obtaining submodule configured to obtain the state of the target object in the target scene output by the state analysis model.

In some embodiments, the control apparatus for drone inspection of the chemical production plant further includes: an establishment module (not shown in FIG. 6) configured to establish a corresponding relationship between the data of the target object and the state of the target object in the target scene; and an update module (not shown in FIG. 6) configured to update the known corresponding relationship based on the corresponding relationship.

In some embodiments, the control apparatus for drone inspection of the chemical production plant further includes: a first receiving module (not shown in FIG. 6) configured to receive an item demand sent by the first drone; and a dispatching module (not shown in FIG. 6) configured to dispatch a second drone for the first drone based on the item demand, so that the second drone transports a target item to an inspector corresponding to the first drone based on the item demand.

In some embodiments, the control apparatus for drone inspection of the chemical production plant further includes: the first drone is provided with a first voice recognition model, and the target object includes an inspector, and the control apparatus for drone inspection of the chemical production plant further includes: a first sending module (not shown in FIG. 6) configured to send the item demand to a system background if the item demand of the inspector is recognized by the first voice recognition model when the first drone receives voice of the inspector.

In some embodiments, the control apparatus for drone inspection of the chemical production plant further includes: a second sending module (not shown in FIG. 6) configured to input collected sound of the target device into the second voice recognition model in a process of performing the preset inspection task by the first drone, and send the item demand to a system background if the item demand matching a fault of the target device is analyzed by the second voice recognition model.

In some embodiments, the control apparatus for drone inspection of the chemical production plant further includes: a third determining module (not shown in FIG. 6) configured to determine an inspection path for the first drone to perform the preset inspection task; and a third sending module (not shown in FIG. 6) configured to send the inspection path to the first drone, so that the first drone performs the preset inspection task based on the inspection path.

In some embodiments, the target object includes an inspector, and the control apparatus for drone inspection of the chemical production plant further includes: a second receiving module (not shown in FIG. 6) configured to receive a control instruction of the inspector sent by the first drone and an execution record of the first drone for the control instruction, where the control instruction is received in a process of performing the preset inspection task by the first drone, and the first drone recognizes that the inspector has control authority to send the control instruction; and a storage module (not shown in FIG. 6) configured to store the control instruction of the inspector and the execution record corresponding to the control instruction.

Those skilled in the art should understand that the functions of the processing modules in the control apparatus for drone inspection of the chemical production plant in the embodiments of the present disclosure can be understood with reference to the relevant description of the control method for drone inspection of the chemical production plant, and the processing modules in the control apparatus for drone inspection of the chemical production plant in the embodiments of the present disclosure may be implemented by an analog circuit that implements the functions in the embodiments of the present disclosure or may be implemented by running software that performs the functions in the embodiments of the present disclosure on an electronic device.

In the control apparatus for drone inspection of the chemical production plant in the embodiments of the present disclosure, the use of the drone to inspect the chemical production plant can improve the efficiency and flexibility of inspection, thereby ensuring the normal operation and safety of the chemical production plant.

According to embodiments of the present disclosure, the present disclosure also provides an electronic device and a readable storage medium.

Figure 7:
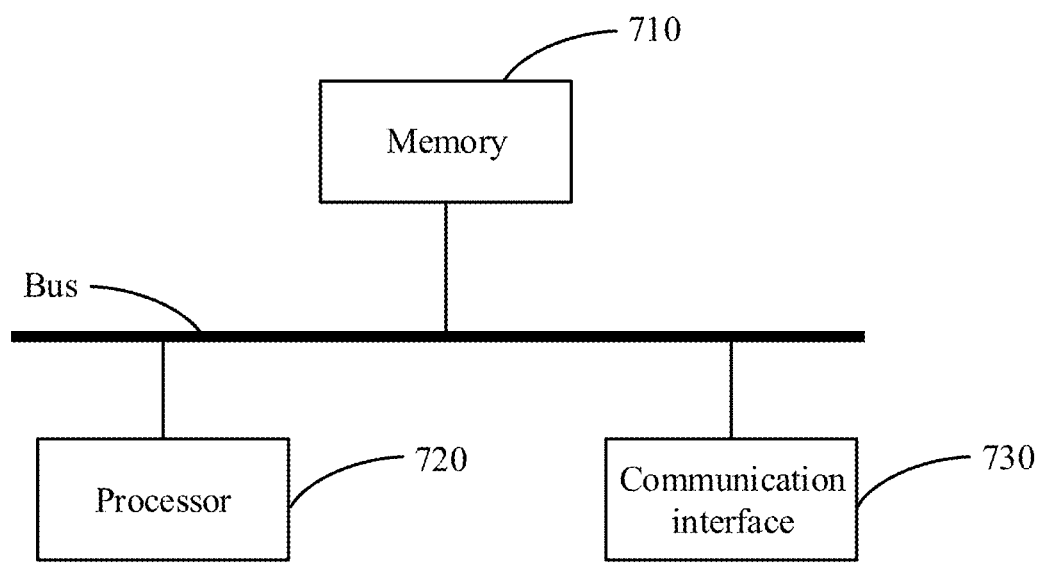
FIG. 7 is a block diagram of an electronic device for implementing the control method for drone inspection of the chemical production plant according to an embodiment of the present disclosure.

FIG. 7 is a structural block diagram of an electronic device according to an embodiment of the present disclosure. As shown in FIG. 7, the electronic device includes: a memory 710 and a processor 720, and the memory 710 stores a computer program that can run on the processor 720. There may be one or more memories 710 and processors 720. The memory 710 may store one or more computer programs, and the one or more computer programs cause the electronic device to perform the method provided in the above method embodiment, when executed by the electronic device. The electronic device may also include: a communication interface 730 configured to communicate with an external device for data interactive transmission.

If the memory 710, the processor 720 and the communication interface 730 are implemented independently, the memory 710, the processor 720 and the communication interface 730 may be connected to each other and complete communication with each other through a bus.

The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 7, but it does not represent only one bus or only one type of bus.

Optionally, in a specific implementation, if the memory 710, the processor 720 and the communication interface 730 are integrated on one chip, the memory 710, the processor 720 and the communication interface 730 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "an embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the quantity of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:
1. A control method for drone inspection of a chemical production plant, comprising:
    determining a first drone for performing a preset inspection task in a target scene, wherein the first drone is responsible for the preset inspection task of the chemical production plant;
    obtaining data of a target object collected by the first drone in the target scene;
    determining a state of the target object in the target scene based on the data of the target object;

outputting prompt information matching a preset state in the target scene in a case of the state represents that the target object is in the preset state of the target scene;
receiving an item demand sent by the first drone; and
dispatching a second drone for the first drone based on the item demand, so that the second drone transports a target item to an inspector corresponding to the first drone based on the item demand;
wherein the preset inspection task comprises:
in a case of the target scene belongs to an active inspection scene and the target object is a device, the preset inspection task is a routine inspection task or a sampling inspection task, wherein the routine inspection task is pre-set, and the sampling inspection task is randomly generated;
in a case of the target scene belongs to an active inspection scene and the target object is a person, the preset inspection task is a routine inspection task or a sampling inspection task;
in a case of the target scene belongs to a passive inspection scene and the target object is a device, the preset inspection task is a first dedicated inspection task, and the first dedicated inspection task is set based on an attribute of the device;
in a case of the target scene belongs to a passive inspection scene and the target object is a person, the preset inspection task is a second dedicated inspection task, and the second dedicated inspection task is generated based on a personnel requirement.

2. The method of claim 1, wherein the determining a first drone for performing a preset inspection task in a target scene, comprises:
in response to receiving a follow instruction forwarded by a drone, determining the drone that forwards the follow instruction as the first drone, wherein the follow instruction is an instruction sent by an inspector to the drone that sends the follow instruction and is used to instruct the drone to follow the inspector to work, and the follow instruction comprises information characterizing the preset inspection task.

3. The method of claim 1, wherein the determining a first drone for performing a preset inspection task in a target scene, comprises:
in response to receiving an operation requirement sent by a terminal, determining the first drone for performing the preset inspection task in the target scene for the terminal from candidate drones based on the operation requirement and state information of the candidate drones, wherein the operation requirement comprises information characterizing the preset inspection task.

4. The method of claim 1, wherein the determining a first drone for performing a preset inspection task in a target scene, comprises:
determining the first drone for performing the preset inspection task in the target scene from candidate drones according to state information of the candidate drones in combination with an inspection cycle.

5. The method of claim 1, wherein the preset state comprises a device abnormal state, and the target object comprises a target device;
wherein the outputting prompt information matching a preset state in the target scene in the case of the state represents that the target object is in the preset state of the target scene, comprises:
outputting prompt information matching the device abnormal state in the target scene in a case of the state represents that the target device is in the device abnormal state of the target scene.

6. The method of claim 1, wherein the preset state comprises a person abnormal state, and the target object comprises a target person;
wherein the outputting prompt information matching a preset state in the target scene in the case of the state represents that the target object is in the preset state of the target scene, comprises:
outputting prompt information matching the person abnormal state in the target scene in a case of the state represents that the target person is in the person abnormal state of the target scene.

7. The method of claim 1, wherein the determining a state of the target object in the target scene based on the data of the target object, comprises:
obtaining a known corresponding relationship, wherein the known corresponding relationship at least comprises a relationship between each state of the target object and corresponding interval data; and
analyzing the state corresponding to the data of the target object in the target scene based on the known corresponding relationship.

8. The method of claim 7, further comprising:
establishing a corresponding relationship between the data of the target object and the state of the target object in the target scene; and
updating the known corresponding relationship based on the corresponding relationship.

9. The method of claim 1, wherein the determining a state of the target object in the target scene based on the data of the target object, comprises:
inputting the data of the target object in the target scene into a state analysis model, wherein the state analysis model is obtained by training based on a known corresponding relationship and is used to predict the state of the target object in the target scene; and
obtaining the state of the target object in the target scene output by the state analysis model.

10. The method of claim 9, further comprising:
establishing a corresponding relationship between the data of the target object and the state of the target object in the target scene; and
updating the known corresponding relationship based on the corresponding relationship.

11. The method of claim 1, wherein the first drone is provided with a first voice recognition model, the target object comprises an inspector, and the method further comprises:
sending the item demand to a system background if the item demand of the inspector is recognized by the first voice recognition model in a case of the first drone receives voice of the inspector.

12. The method of claim 1, wherein the first drone is provided with a second voice recognition model, the target object comprises a target device, and the method further comprises:
inputting collected sound of the target device into the second voice recognition model in a process of performing the preset inspection task by the first drone, and sending the item demand to a system background if the item demand matching a fault of the target device is analyzed by the second voice recognition model.

13. The method of claim 1, further comprising:
determining an inspection path for the first drone to perform the preset inspection task; and sending the inspection path to the first drone, so that the first drone performs the preset inspection task based on the inspection path.

14. The method of claim 1, wherein the target object comprises an inspector, and the method further comprises:
receiving a control instruction of the inspector sent by the first drone and an execution record of the first drone for the control instruction, wherein the control instruction is received in a process of performing the preset inspection task by the first drone, and the first drone recognizes that the inspector has control authority to send the control instruction; and
storing the control instruction of the inspector and the execution record corresponding to the control instruction.

15. An electronic device, comprising:
at least one processor; and
a memory connected in communication with the at least one processor;
wherein the memory stores an instruction executable by the at least one processor, and the instruction, when executed by the at least one processor, enables the at least one processor to execute:
determining a first drone for performing a preset inspection task in a target scene, wherein the first drone is responsible for the preset inspection task of the chemical production plant;
obtaining data of a target object collected by the first drone in the target scene;
determining a state of the target object in the target scene based on the data of the target object;
outputting prompt information matching a preset state in the target scene in a case of the state represents that the target object is in the preset state of the target scene;
receiving an item demand sent by the first drone; and
dispatching a second drone for the first drone based on the item demand, so that the second drone transports a target item to an inspector corresponding to the first drone based on the item demand;
wherein the preset inspection task comprises:
in a case of the target scene belongs to an active inspection scene and the target object is a device, the preset inspection task is a routine inspection task or a sampling inspection task, wherein the routine inspection task is pre-set, and the sampling inspection task is randomly generated;
in a case of the target scene belongs to an active inspection scene and the target object is a person, the preset inspection task is a routine inspection task or a sampling inspection task;
in a case of the target scene belongs to a passive inspection scene and the target object is a device, the preset inspection task is a first dedicated inspection task, and the first dedicated inspection task is set based on an attribute of the device;
in a case of the target scene belongs to a passive inspection scene and the target object is a person, the preset inspection task is a second dedicated inspection task, and the second dedicated inspection task is generated based on a personnel requirement.

16. The electronic device of claim 15, wherein the determining a first drone for performing a preset inspection task in a target scene, comprises:
in response to receiving a follow instruction forwarded by a drone, determining the drone that forwards the follow instruction as the first drone, wherein the follow instruction is an instruction sent by an inspector to the drone that sends the follow instruction and is used to instruct the drone to follow the inspector to work, and the follow instruction comprises information characterizing the preset inspection task.

17. The electronic device of claim 15, wherein the determining a first drone for performing a preset inspection task in a target scene, comprises:
in response to receiving an operation requirement sent by a terminal, determining the first drone for performing the preset inspection task in the target scene for the terminal from candidate drones based on the operation requirement and state information of the candidate drones, wherein the operation requirement comprises information characterizing the preset inspection task.

18. A non-transitory computer-readable storage medium storing a computer instruction thereon, wherein the computer instruction is used to cause a computer to execute:
determining a first drone for performing a preset inspection task in a target scene, wherein the first drone is responsible for the preset inspection task of the chemical production plant;
obtaining data of a target object collected by the first drone in the target scene;
determining a state of the target object in the target scene based on the data of the target object;
outputting prompt information matching a preset state in the target scene in a case of the state represents that the target object is in the preset state of the target scene;
receiving an item demand sent by the first drone; and
dispatching a second drone for the first drone based on the item demand, so that the second drone transports a target item to an inspector corresponding to the first drone based on the item demand;
wherein the preset inspection task comprises:
in a case of the target scene belongs to an active inspection scene and the target object is a device, the preset inspection task is a routine inspection task or a sampling inspection task, wherein the routine inspection task is pre-set, and the sampling inspection task is randomly generated;
in a case of the target scene belongs to an active inspection scene and the target object is a person, the preset inspection task is a routine inspection task or a sampling inspection task;
in a case of the target scene belongs to a passive inspection scene and the target object is a device, the preset inspection task is a first dedicated inspection task, and the first dedicated inspection task is set based on an attribute of the device;
in a case of the target scene belongs to a passive inspection scene and the target object is a person, the preset inspection task is a second dedicated inspection task, and the second dedicated inspection task is generated based on a personnel requirement.

19. The non-transitory computer-readable storage medium of claim 18, wherein the determining a first drone for performing a preset inspection task in a target scene, comprises:
in response to receiving a follow instruction forwarded by a drone, determining the drone that forwards the follow instruction as the first drone, wherein the follow instruction is an instruction sent by an inspector to the drone that sends the follow instruction and is used to instruct the drone to follow the inspector to work, and the follow instruction comprises information characterizing the preset inspection task.

20. The electronic device of claim 15, wherein the determining a first drone for performing a preset inspection task in a target scene, comprises:

determining the first drone for performing the preset inspection task in the target scene from candidate drones according to state information of the candidate drones in combination with an inspection cycle.

\* \* \* \* \*